(12) United States Patent
Sheahan, Jr. et al.

(10) Patent No.: US 8,614,555 B2
(45) Date of Patent: Dec. 24, 2013

(54) SYSTEM AND METHOD FOR ENERGY CAPTURE AND DISTRIBUTION

(75) Inventors: James J. Sheahan, Jr., Florissant, MO (US); Thomas W. Omohundro, St. Charles, MO (US); James L. Peck, Jr., Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/428,768

(22) Filed: Mar. 23, 2012

(65) Prior Publication Data

US 2012/0181856 A1 Jul. 19, 2012

Related U.S. Application Data

(63) Continuation of application No. 12/264,488, filed on Nov. 4, 2008, now Pat. No. 8,164,283.

(51) Int. Cl.
*H02P 3/14* (2006.01)

(52) U.S. Cl.
USPC .......... 318/376; 318/139; 318/800; 318/801; 318/374; 318/375; 323/259; 323/260; 323/344; 123/564; 180/65.1; 180/65.21; 180/65.225

(58) Field of Classification Search
USPC ............. 318/34, 580, 583, 599, 152, 156, 318/400.06, 376, 625, 37, 87, 114, 139, 318/400.01, 400.26, 703, 757, 799, 800, 318/801, 810, 811, 258, 362, 370, 371, 374, 318/375, 445, 498, 512, 520, 552, 554, 722, 318/759, 432; 363/50, 21.12, 34, 37, 40, 363/51, 55, 65, 74, 75, 82, 90, 95, 101, 102, 363/108, 109, 124; 307/43, 125; 244/99.2; 180/9.1, 65.4, 65.1, 65.21, 65.225; 323/259, 260, 344; 123/564; 320/140
See application file for complete search history.

(56) References Cited

U.S. PATENT DOCUMENTS

| | | | | |
|---|---|---|---|---|
| 5,373,195 | A * | 12/1994 | De Doncker et al. | 307/45 |
| 5,703,456 | A * | 12/1997 | Cox | 318/701 |
| 5,710,699 | A * | 1/1998 | King et al. | 363/132 |
| 5,850,113 | A * | 12/1998 | Weimer et al. | 307/125 |
| 5,982,156 | A | 11/1999 | Weimer et al. | |
| 6,700,802 | B2 | 3/2004 | Ulinski et al. | |
| 6,748,737 | B2 | 6/2004 | Lafferty | |
| 7,012,392 | B2 | 3/2006 | Nguyen et al. | |
| 7,049,792 | B2 * | 5/2006 | King | 320/126 |
| 7,220,365 | B2 | 5/2007 | Qu et al. | |
| 7,279,858 | B2 | 10/2007 | Takeuchi | |
| 7,571,683 | B2 | 8/2009 | Kumar | |
| 7,600,593 | B2 * | 10/2009 | Filippov et al. | 180/9.1 |
| 7,940,016 | B2 * | 5/2011 | Donnelly et al. | 318/139 |
| 8,080,973 | B2 * | 12/2011 | King et al. | 320/104 |
| 8,155,898 | B2 * | 4/2012 | Krein et al. | 702/60 |
| 8,164,283 | B2 | 4/2012 | Sheahan, Jr. et al. | |
| 2004/0189226 | A1 * | 9/2004 | King | 318/375 |

(Continued)

*Primary Examiner* — Antony M Paul
(74) *Attorney, Agent, or Firm* — Toler Law Group, PC

(57) ABSTRACT

An actuator control system includes a controller and a buck-boost circuit. The controller is configured to direct power from a power source to an actuator. The actuator is coupled to a control device to apply a force related to operation of a vehicle. The buck-boost circuit is configured to direct excess power generated by the actuator to an energy storage device when an actuator power level satisfies an anticipated power level.

17 Claims, 13 Drawing Sheets

(56) References Cited

U.S. PATENT DOCUMENTS

| | | |
|---|---|---|
| 2006/0065779 A1 | 3/2006 | McCoskey et al. |
| 2006/0076171 A1* | 4/2006 | Donnelly et al. .......... 180/65.2 |
| 2006/0108867 A1 | 5/2006 | Ralea |
| 2007/0068714 A1* | 3/2007 | Bender ..................... 180/65.4 |
| 2008/0094866 A1* | 4/2008 | Bauman et al. ............... 363/50 |
| 2008/0218104 A1* | 9/2008 | Lukic et al. ................. 318/139 |
| 2009/0295314 A1 | 12/2009 | Ganev et al. |
| 2009/0302153 A1* | 12/2009 | Matasso et al. ............. 244/99.2 |

* cited by examiner

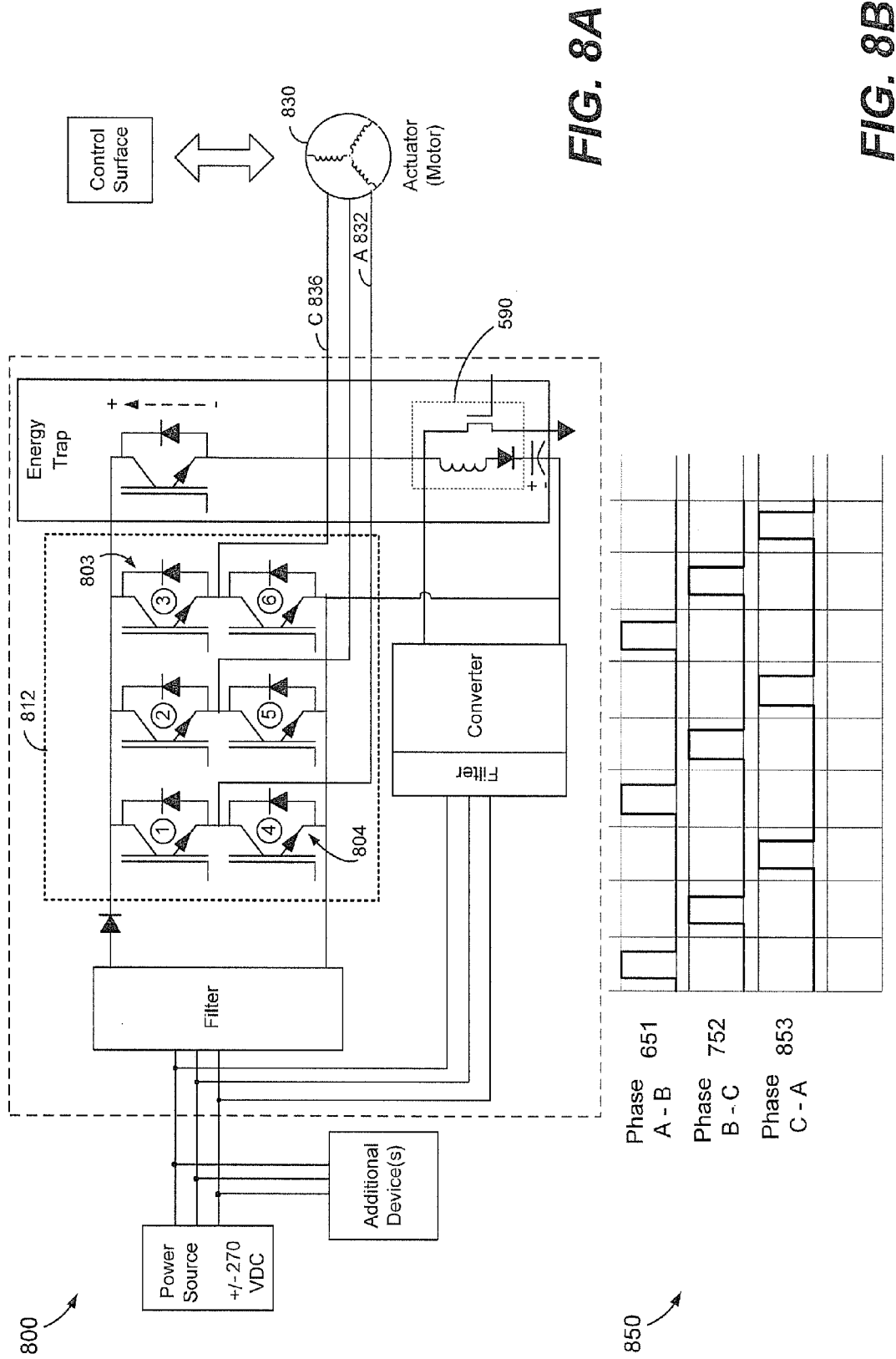

SYSTEM AND METHOD FOR ENERGY CAPTURE AND DISTRIBUTION

CROSS-REFERENCE TO RELATED APPLICATIONS

This application claims priority from and is a continuation of U.S. patent application Ser. No. 12/264,488, entitled "SYSTEM AND METHOD FOR ENERGY CAPTURE AND DISTRIBUTION," filed Nov. 4, 2008, the entire contents of which are expressly incorporated herein by reference.

FIELD OF THE DISCLOSURE

The present disclosure is generally related to capturing power generated by application of an external mechanical force to a control device.

BACKGROUND

In a vehicle, such as an aircraft, electric power supplied by a generator or another device is used to power control devices, such as aircraft ailerons, flaps, rudders, other control surfaces, and other electric motor devices and controllers to direct the motion of the vehicle as well as other electric motor devices and controllers. A significant quantity of electrical power is supplied to actuators, which may include electric motors, where the electrical power is converted into mechanical power to control the motion of the vehicle.

For example, in an aircraft, electrical power may be carried via a bus to the actuators physically coupled to ailerons to provide power to the ailerons to control the attitude of the aircraft. On the other hand, as a result of aerodynamic forces, turbulence and atmospheric conditions, externally-applied mechanical pressure applied to the ailerons may result in the actuator being back-driven (or forward-driven) which results in generating electrical power that results in a decrease in the energy required from power generation devices. Similarly, directional reversals due to the electric motor inertia, such as also may result in generating electrical power. The electrical power generated by the motors and other actuators as a result of the externally-applied forces, when joined with the electrical power supplied by the power generation devices to the actuators, may result in excess electrical power being carried on the bus.

Conventionally, the excess electrical power on the bus may be dissipated by directing the excess electrical power, in the form of a flow of electric current, to a dedicated resistive load where the electric current is dissipated as heat. Dumping the excess electrical energy by directing an electric current through a dedicated resistive load is wasteful and generally undesirable due to thermal impacts to the system.

SUMMARY

Embodiments disclosed herein constructively use excess electrical power applied to a bus configured to carry electrical power to a motor or other actuator for a control device when inertia or application of an external force to the control surface causes the actuator to generate electrical power. An actuator control system can monitor an electrical power level carried by the bus by monitoring actuator voltage levels. When the electrical power level exceeds an anticipated power level, such as the level required to supply the connected load, excess electrical energy is directed to an energy storage device from which electrical energy can later be drawn when additional energy is needed. In one particular illustrative embodiment, it is desirable to smooth the voltage waveform carried by the bus. Accordingly, when the actuator power level on the bus exceeds an anticipated power level, excess electrical energy may be directed to the energy storage device to store the excess electrical energy for later use. Alternately, when the actuator power level drops below the anticipated power level or the connected load demands more power than can readily be provided, supplemental electrical power is distributed from the energy storage device to the bus to increase the bus power level and maintain a smooth, consistent bus voltage waveform.

In one particular illustrative embodiment, at least one actuator is coupled to a control device configured to apply a force related to operation of a vehicle. An electrical bus is configured to conduct power to the at least one actuator. An actuator control system is configured to receive energy from an energy source via the bus and direct the energy to the at least one actuator. The actuator control system is also configured to monitor the actuator power level to determine when the actuator power does not meet an anticipated power level. When the actuator power level exceeds the anticipated power level, excess power generated is directed to an energy storage device. Alternatively, when the actuator power level is less than the anticipated power level, supplemental energy is drawn from the energy storage device and directed to the bus.

In another particular illustrative embodiment, an energy capture and actuator control system for an aircraft includes at least one actuator coupled to a control device of the aircraft. The actuator is configured to apply a mechanical force to the control device in response to receiving input energy and to generate produced energy in response to the application of a nongenerated force upon the control device. The actuator control system is configured to distribute input energy from a power source to the at least one actuator. The actuator control system is further configured to distribute the output energy from the at least one actuator to at least one energy storage device where the output energy may be stored.

In still another embodiment, a power source is coupled via a bus to an actuator configured to manipulate a control device of a vehicle. An energy storage device is coupled to receive excess energy from the bus where the excess energy is caused by application of a nongenerated mechanical force upon the control device coupled to the actuator. An actuator power level is monitored. When the actuator power level exceeds an anticipated power level indicating that the excess power is being generated, the excess power is directed to an energy storage device.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

FIGS. 6A, 7A, and 8A are schematic diagrams of a particularly illustrative embodiment of the energy capture and distribution system of FIG. 5 used to illustrate application of commutation pulses to drive an actuator;

FIGS. 6B, 7B, and 8B are cumulative plots of the commutation pulses generated by the energy capture and distribution systems of FIGS. 6A, 7A, and 8A, respectively;

DETAILED DESCRIPTION

Particular illustrative embodiments disclosed herein describe systems and methods for capturing and using power generated by an electrical motor or another actuator coupled to a control device as a result of inertia or an external mechanical force applied to a control device or control surface coupled with the actuator. An actuator may be an electric motor that is coupled with a control device, such as a motor used for propulsion or other purposes. An actuator also may be coupled to a control surface, such as an aileron of an aircraft. Generally, an actuator consumes electrical power. For example, when an actuator coupled to an aileron receives electrical power via a bus from a power source, and the electrical power is used to position the aileron to direct the motion of the aircraft. Conversely, as a result of turbulence or other atmospheric conditions applied to the aileron surface, the control surface may be subject to buffeting conditions, gusts, or other externally-applied mechanical forces that drive the actuator to generate electrical power. The electrical power generated may result in excess power being applied to the bus. Electrical power also may be generated by actuators in response to inertia, rather than externally applied forces. Thus, for example, electric motor devices subject to motor reversal also may generate significant levels of electrical power. According to particular illustrative embodiments, electrical power generated by one or more actuators is directed to an energy storage device from which supplemental energy can be drawn as needed to provide power to the actuator or to other devices.

Figure 1:
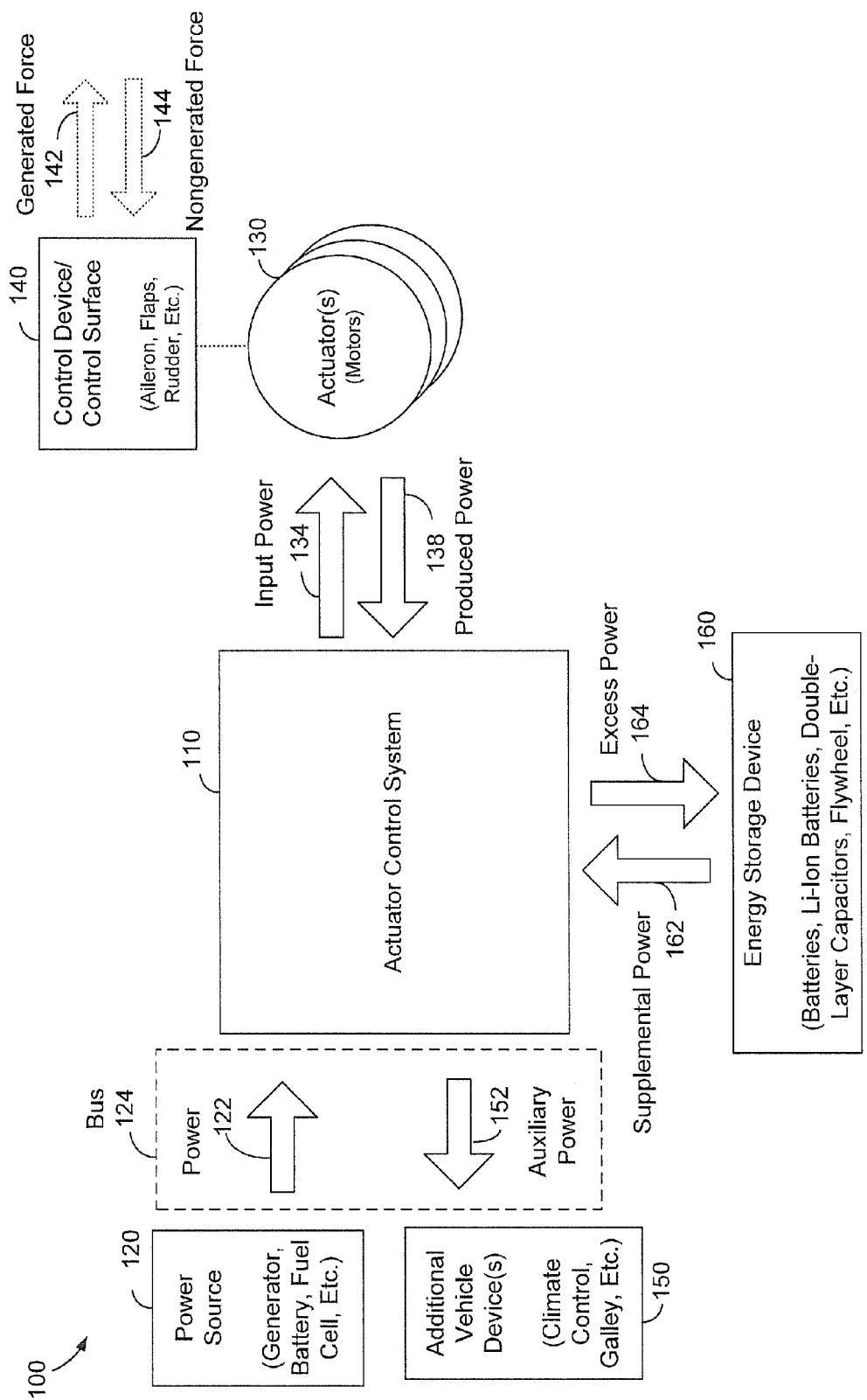
FIG. 1 is a block diagram of a particular illustrative embodiment of an energy capture and distribution system for a vehicle.

FIG. 1 is a block diagram of a particular illustrative embodiment of an energy capture and actuator control system, generally designated 100, for a vehicle such as an aircraft or another vehicle. The system 100 includes an actuator control system 110 that controls the supply of power and capture of energy throughout the system 100. The actuator control system 110 is configured to draw power 122 from a power source 120 via a bus 124. The power source 120 may include a generator, such as a generator coupled to an engine of the vehicle to convert and capture electrical power from mechanical power produced by rotation of the engine that provides the locomotive force for the vehicle. The power source 120 may also include one or more batteries, chemical fuel cells, or other devices configured to provide electrical energy for onboard systems.

The power 122 provided by the power source 120 via the bus 124 may be used as a primary source of power for actuators 130 that power control devices or control surfaces 140 or for one or more additional vehicle devices that relate to operation of the vehicle. For example, the control devices on an aircraft may include motors and fans used for propulsion or ventilation, opening or closing gear doors or access panels, braking the aircraft, or other purposes related to control of the aircraft, while the control surfaces on an aircraft may include ailerons, flaps, rudders, slats, stabilators, flaperons, and other control surfaces used to control the motion of the aircraft. Control devices 140 on other vehicles may include the steering linkages or shock absorbers of a ground vehicle or the rudders or sails of a watercraft, as well as other devices related to control of such vehicles. The actuators 130 may include devices configured to convert electrical power into mechanical power to move the control devices 140. The actuators 130 may include motors, such as stepper motors, impulse-driven motors, or other electric motors used to manipulate control devices or control surfaces. In addition, the actuators 130 may include, for example, extensible members such as pneumatic cylinders, hydraulic cylinders, or shape memory alloy linkages that may be used to manipulate control devices and control surfaces. The actuators 130 may directly manipulate the control devices 140 or the actuators 130 may be used to control hydraulic or pneumatic devices used to manipulate the control devices 140.

The actuator control system 110 receives the power 122 from the power source 120 and directs the power 122 to the actuator 130. As further described below, an actuator power level may vary from an anticipated power level. The actuator control system 110 directs input power 134 to the bus to cause the actuator 130 to manipulate the control device 140 to produce a generated force 142 to direct the motion of the vehicle or otherwise further the operation of the vehicle. However, the actuator 130 may yield produced power 138 as a result of a nongenerated force 144 applied to the control device 140. One example of a nongenerated force 144 in an aircraft would be turbulence or other buffeting conditions that may apply an external force to the control surface 140 that causes the actuator to generate power, such as the produced power 138. Alternatively, the nongenerated force 144 may be an inertial force of a motor that may be experienced during braking or another directional reversal of a motor. Although the motor may have been set in motion by application of a generated force 142, once power is cut or reversed to the control device 140, the inertial force is a Newtonian force rather than a force resulting directly from the supply of power to the actuator 130 coupled to the control device 140. In any case, the "back-driving" of control devices or control surfaces 140 by external or inertial forces (or "forward-driving" of control devices or control surfaces by those same forces) may cause actuators 130 to regenerate or otherwise yield produced power 138. The produced power 138, if not otherwise directed, may results in excess power being applied to the bus 124.

The actuator control system 110 monitors the actuator power level. In one embodiment, when the actuator power level meets the anticipated power level, the actuator control system 110 continues to monitor the actuator power level. On the other hand, when the actuator power level does not meet the anticipated power level, but exceeds the anticipated power level as a result of the produced power 138 produced by the actuator 130, the actuator control system 110 directs the excess power 164 to an energy storage device 160 to store the excess power 164 in the energy storage device. The energy stored in the energy storage device 160 may be later used to provide input power 134 for the actuators 130 or to provide auxiliary power 152 to power additional vehicle devices. Storing the excess power 164 as potential energy in the energy storage device 160 also provides a benefit in that the excess power 164 is not dissipated in a dedicated resistive load, potentially resulting in wasteful heat, as previously described.

In one particular illustrative embodiment, supplemental power 162 may be drawn from the energy storage device 160 to provide additional input power 134 to the actuator 130 when the actuator power level is less than an anticipated power level. Thus, the energy stored in the energy storage device 160 may be used as supplemental power 162 to meet the transient power demanded from the bus and thereby smooth the bus voltage waveform and improve electrical power quality. Smoothing the bus waveform level may provide for improved or more consistent performance of the actuator 130, and may potentially reduce wear and thus prolong the life of the actuator 130, the control device 140, or other components.

The energy storage device 160 may include one or more devices capable of receiving and storing excess power as potential energy. For example, the energy storage device 160 may include chemical storage devices, such as fuel cells, or electrochemical storage devices such as rechargeable batteries, both of which are capable of storing potential energy. In one particular illustrative embodiment, lithium ion batteries may be used. Lithium ion batteries have a high energy density, a long useful life, and require little maintenance. Other battery technologies, such as nickel cadmium (NiCad), nickel metal hydride (NiMH), and lead-acid (Pb-acid) battery technologies also may be used.

In addition to or instead of batteries, in another particular illustrative embodiment, the energy storage device 160 may include electrochemical devices in the form of electric double-layer capacitors commonly known as "supercapacitors" (supercaps) or "ultracapacitors ("ultracaps") that are capable of efficiently storing significant quantities of energy. In still another particular illustrative embodiment, the energy storage device 160 may include mechanical storage devices, such as one or more flywheels that mechanically store received energy as kinetic energy that can subsequently be efficiently converted back to electrical energy. The energy storage device 160 also may include a chargeable fuel cell or any other technology for storing energy.

Figure 2:
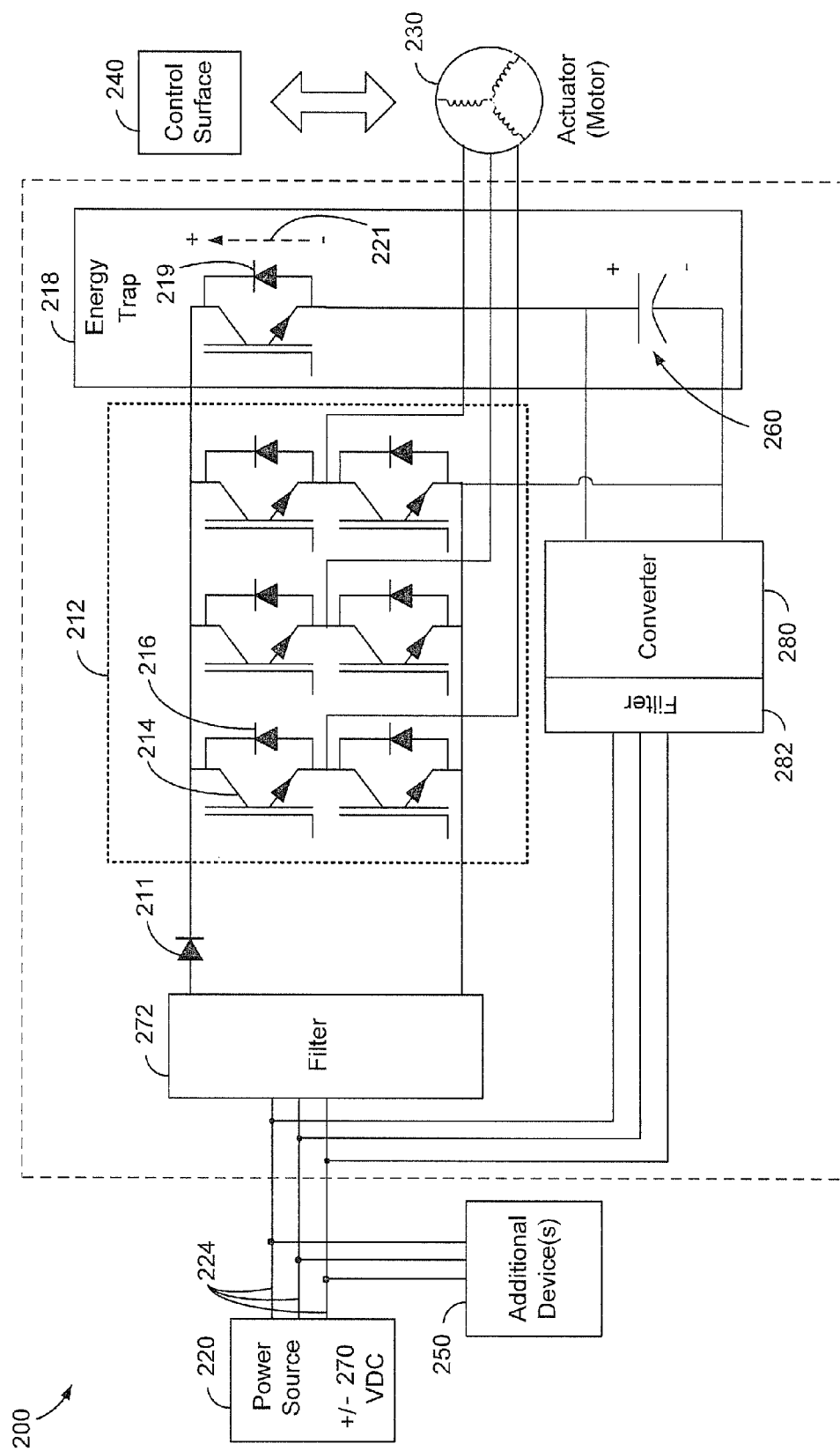
FIG. 2 is a schematic diagram of a particular illustrative embodiment of an energy capture and distribution system.

FIG. 2 is a schematic diagram of a particular illustrative embodiment of an energy capture and actuator control system, generally designated 200, as previously described with reference to the block diagram of FIG. 1. The energy capture and actuator control system 200 includes an actuator control system 210 that receives power from a power source 220 via a bus 224. The actuator control system 210 supplies power to and receives power from an actuator 230 (which may be in the form of an electric motor) that is coupled with a control surface 240 that receives mechanical force applied by the actuator 230 to consume power supplied to the actuator 230 and applies mechanical force to the actuator 230 to generate power. Along with the actuator 230, one or more additional devices 250 receive power from the power source 220. For example, on an aircraft, additional devices that receive power from the power source 220 may include flight systems, such as avionics and external lights, passenger cabin systems, such as cabin lights, cabin environmental control systems, galley appliances, and entertainment systems, or any other aircraft devices that consume electrical power. As previously described, the power supplied to the actuator 230 or the additional devices 250 may include power supplied by the power source 220 or power captured by the actuator control system 210 from the actuator 230 and stored or redistributed to supply power to the actuator 230 or the additional devices.

In one particular illustrative embodiment, the actuator control system 210 includes a network of transistor nodes 212 where each network of transistor nodes includes an Integrated Gate Bipolar Transistor (IGBT) 214 and a reverse current diode 216. The configuration enables power to be supplied from the storage device 260 to the actuator 230 via the energy trap diode 219, with a positive flow of current passing from an anode of the energy trap diode 219 to the cathode of the energy trap diode 219 as represented by the arrow 221. The configuration of the transistor nodes 212 also enables a flow of current from the power source 220 to be applied to the actuator 230. The network of transistor nodes 212 enables current to pass to the energy storage device 260. Current that flows to the energy storage device 260 is captured and stored as electrical energy. The actuator control system 210 thus provides power to the actuator 230 and, when the actuator 230 requires additional large transient power, the actuator control system 210 draws power from the energy storage device 260 and distributes the power to the actuator to fully supply the actuator 230 transient demand and correspondingly reduce or eliminate the voltage transient that would have resulted on the aircraft power bus—thus improving electrical bus power quality to an acceptable level. On the other hand, should the application of an external force to the control surface (or sudden reversal in commanded motor speed) causes the actuator 230 to produce power, that power is blocked from flowing back to the power source 220 or other additional devices 250 by the blocking diode 211. Instead, the energy trap 218 directs the power to the energy storage device 260 where the energy is stored and from which the energy can be selectively distributed to devices by the actuator control system 210. The blocking diode 211, network of transistor nodes 212, and energy trap 218, however, are just one possible embodiment of a circuit that may be used to direct a flow of current from the energy source 220. The network of transistor nodes 212 could be replaced by a microprocessor-controlled energy redirection system or another circuit configured to redirect the flow of energy.

The actuator control system 210 also includes a converter 280 and a pair of filters 272 and 282. In a vehicle power system, such as an aircraft power system, the power source 220 includes a fixed voltage source, such as a 270 volt direct current (270 VDC) power source from which power is supplied to various vehicle systems. The converter 280 converts energy stored by the energy storage device to provide DC voltage at a selected voltage or to or to provide alternating current (AC) voltage for other vehicle systems and additional devices 250. The converter 280 converts a first voltage, the voltage of the energy storage device 260, to a second voltage as needed to transfer energy out of the energy storage device 260, and onto the power bus 224 that, in one embodiment, carries power at (270 VDC).

The DC/DC converter 280 also is equipped with a filter 282. The filter 282 prevents noise from reaching the vehicle power system as a result of the normal operation of the actuator 230 and the captured, excess power being recirculated by the actuator control system 210. The filter 282 may be configured to filter out power spikes or power signals presented at an undesirable frequency as a result of power being produced at an uncontrolled frequency by the application of external forces to a control surface coupled to an actuator or due to rapidly changing mode commands provided to the actuator 230. For example, low-pass filters coupled with the aircraft bus could be used to filter out high-frequency signals or spikes.

Figure 3:
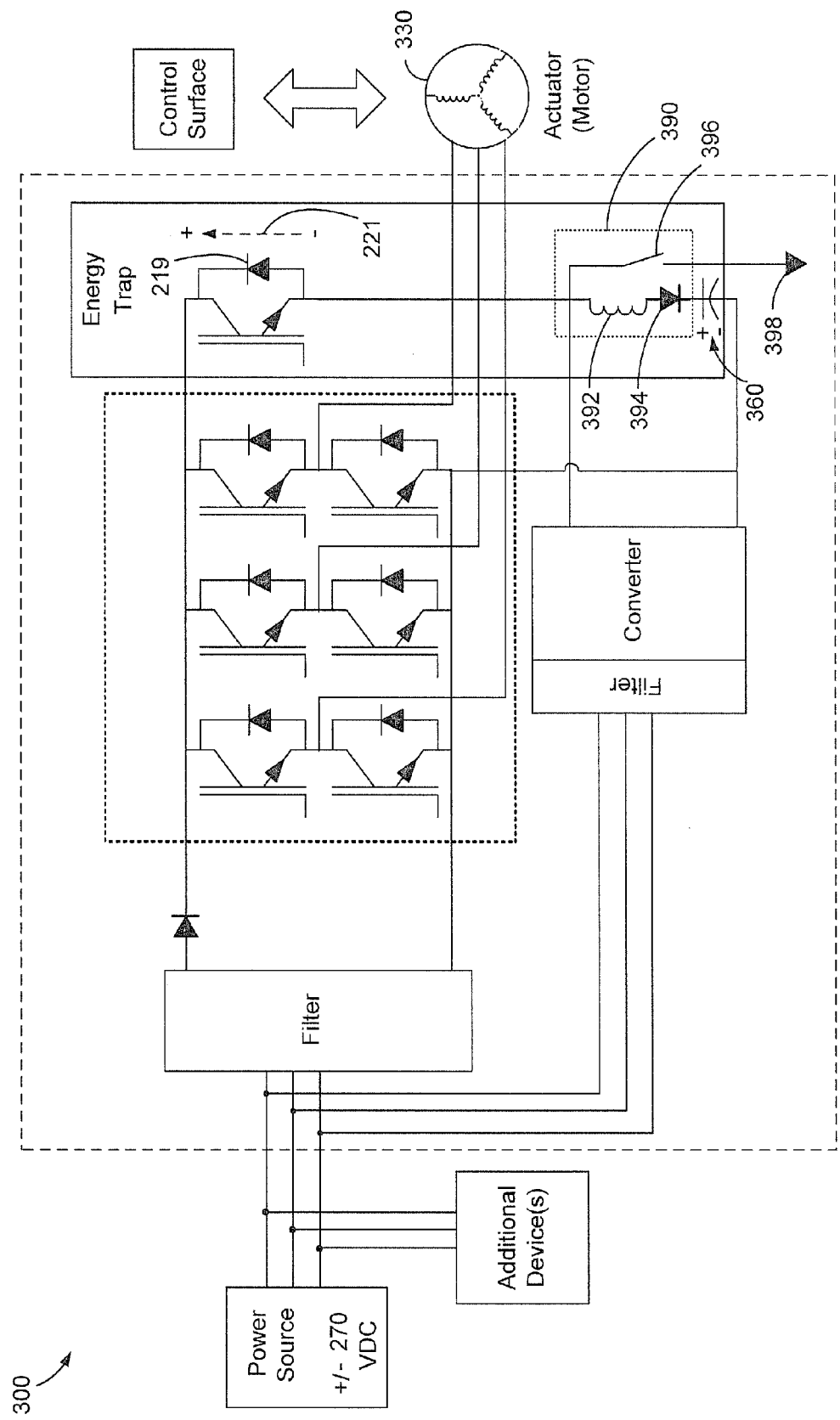
FIGS. 3 and 4 are schematic diagrams of particular illustrative embodiments of energy capture and distribution systems using a buck-boost circuit to control directing energy to or drawing energy from an energy capture device.

FIG. 3 is a schematic diagram of another particular illustrative embodiment of an energy capture and distribution system, generally designated 300. The energy capture and distribution system 300 is substantially the same as the energy capture and distribution system 200 of FIG. 2. The energy capture and distribution system 300 includes, in the energy trap 318, a buck-boost circuit 390. The buck-boost circuit 390 is configured to direct excess power generated by an actuator 330 to an energy storage device 360 and draw supplemental power from the energy storage device 360, and directing the supplemental power to the bus 324 as appropriate.

The buck-boost circuit 390 includes an inductor 392 in series with a diode 394 coupled to a positive terminal 362 of the energy storage device 360. The inductor 392 and the diode 394 are connected in parallel with a switch 396 coupled to a relative ground 398. When the switch 396 is in the open position, energy is accumulated in the inductor 392 and is transferred to the energy storage device 360. When the switch 396 is in the closed position, energy is not accumulated in the inductor 392 and energy may be drawn from the energy storage device 360. The buck-boost circuit 390 thus enables a substantially smooth bus voltage waveform to be maintained by directing the excess power generated by the actuator 330 to the energy storage device 360 and drawing the supplemental power from the energy storage device 360 as appropriate.

Figure 4:
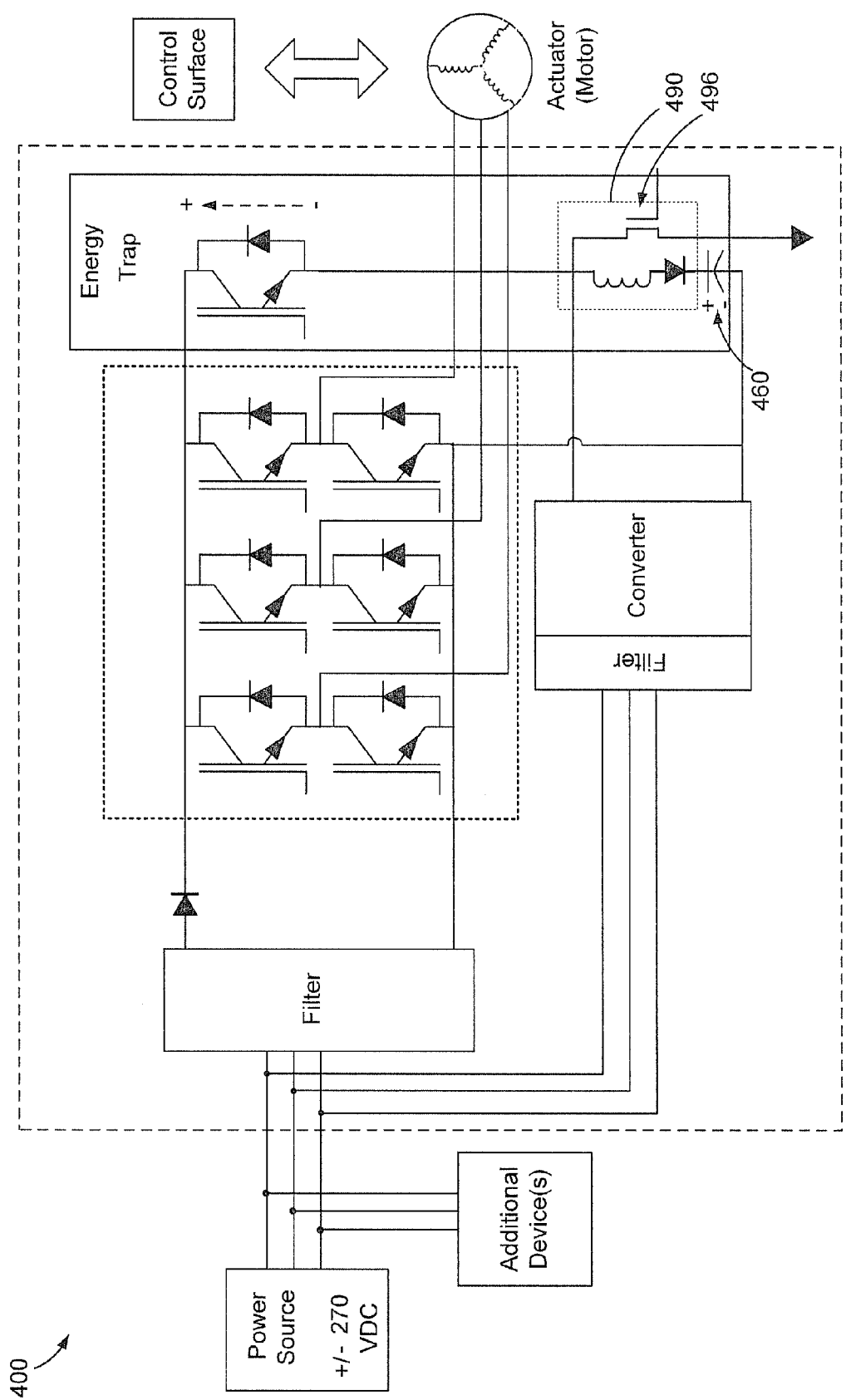

FIG. 4 is a schematic diagram of another particular illustrative embodiment of an energy capture and distribution system, generally designated 400. The energy capture and distribution system 400 is substantially the same as the energy capture and distribution system 300 of FIG. 3. In the energy capture and distribution system 400, a transistor 496 serves as a switch of the buck-boost circuit 490. An output of the buck-boost circuit 490 is a function of a duty cycle of the transistor 496 in switching between its open and closed positions. In an embodiment using the transistor 496 in the buck-boost circuit 490, current across the inductor 492 is maintained above zero during a commutation cycle, as described further below with reference to FIGS. 5-8. The buck-boost circuit 490 using the transistor 496 thus enables a substantially smooth bus voltage waveform to be maintained throughout a plurality of commutation cycles in which power is alternatively provided to the actuator 430 and received from the actuator 430.

FIGS. 5-9 present a series of schematic diagrams of a particular illustrative embodiment of an energy capture and distribution system used to alternately provide power to an actuator 530 and receive or harvest power from the actuator 530 during a plurality of commutation cycles. In the example of FIGS. 5-9, as in the examples of FIGS. 2-4, the actuator is a three-pole DC motor. The poles of the three-pole DC motor, identified as A, B, and C, are provided with power commutation pulses in a three-phase commutation cycle, including an A-B phase, a B-C phase, and a C-A phase, via a plurality of power lines to power the actuator, including line A 532, line B 534, and line C 536. By applying each of the commutation pulses to respective power lines, the commutation pulses drive the actuator 530. As further described below, energy is received or harvested from the actuator 530 between the phases of the commutation cycle.

Figure 5:
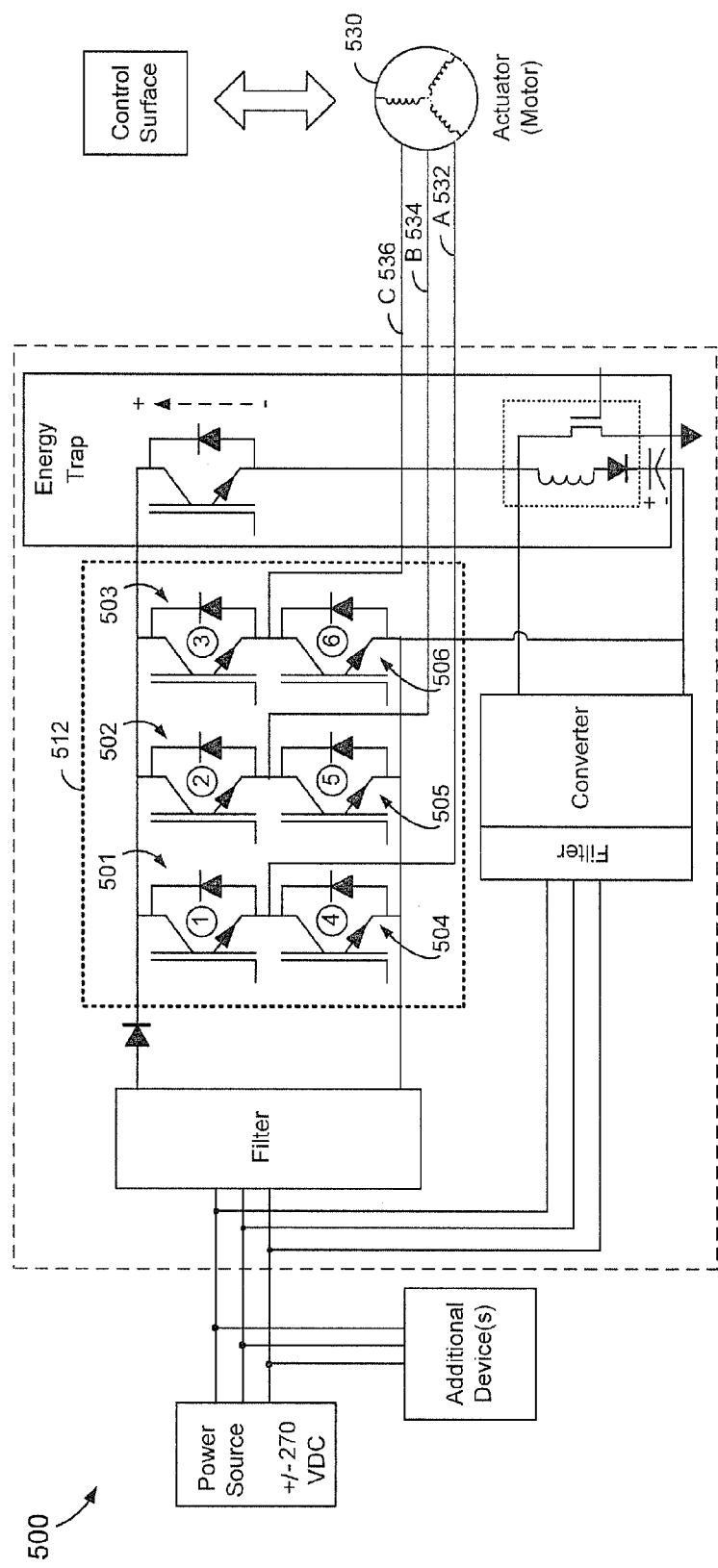
FIG. 5 is a schematic diagrams of a particular illustrative embodiment of an energy capture and distribution system applying commutation pulses to power on the actuator and harvesting power between the commutation pulses.

FIG. 5 is a schematic diagram of the energy capture and distribution system in which energy is being provided to the actuator 530 in an A-B phase of a commutation cycle. The energy capture and distribution system is generally designated 500. The network of transistor nodes 512, as previously described with reference to FIG. 2, provides power to the actuator 530. Specifically, individual transistor nodes of the network of transistor nodes 512, including node 1 (501), node 2 (502), node 3 (503), node 4 (504), node 5 (505), and node 6 (606), systematically apply commutation pulses to pairs of power lines coupled to the actuator 530, including actuator line A 532, actuator line B 534, and actuator line C 536, as described with reference to FIGS. 6-9.

Figures 6A, 6B:
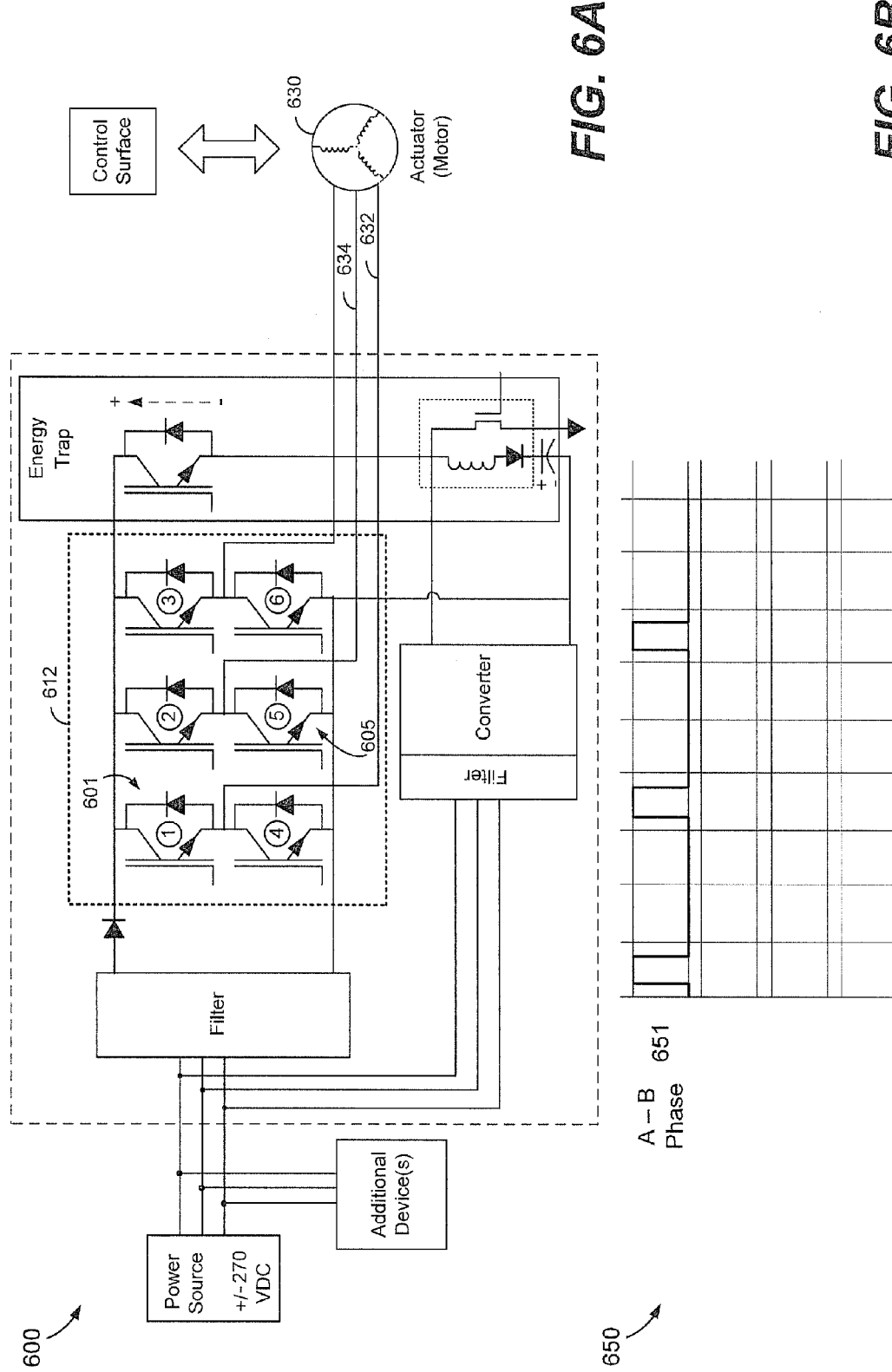
Figures 7A, 7B:
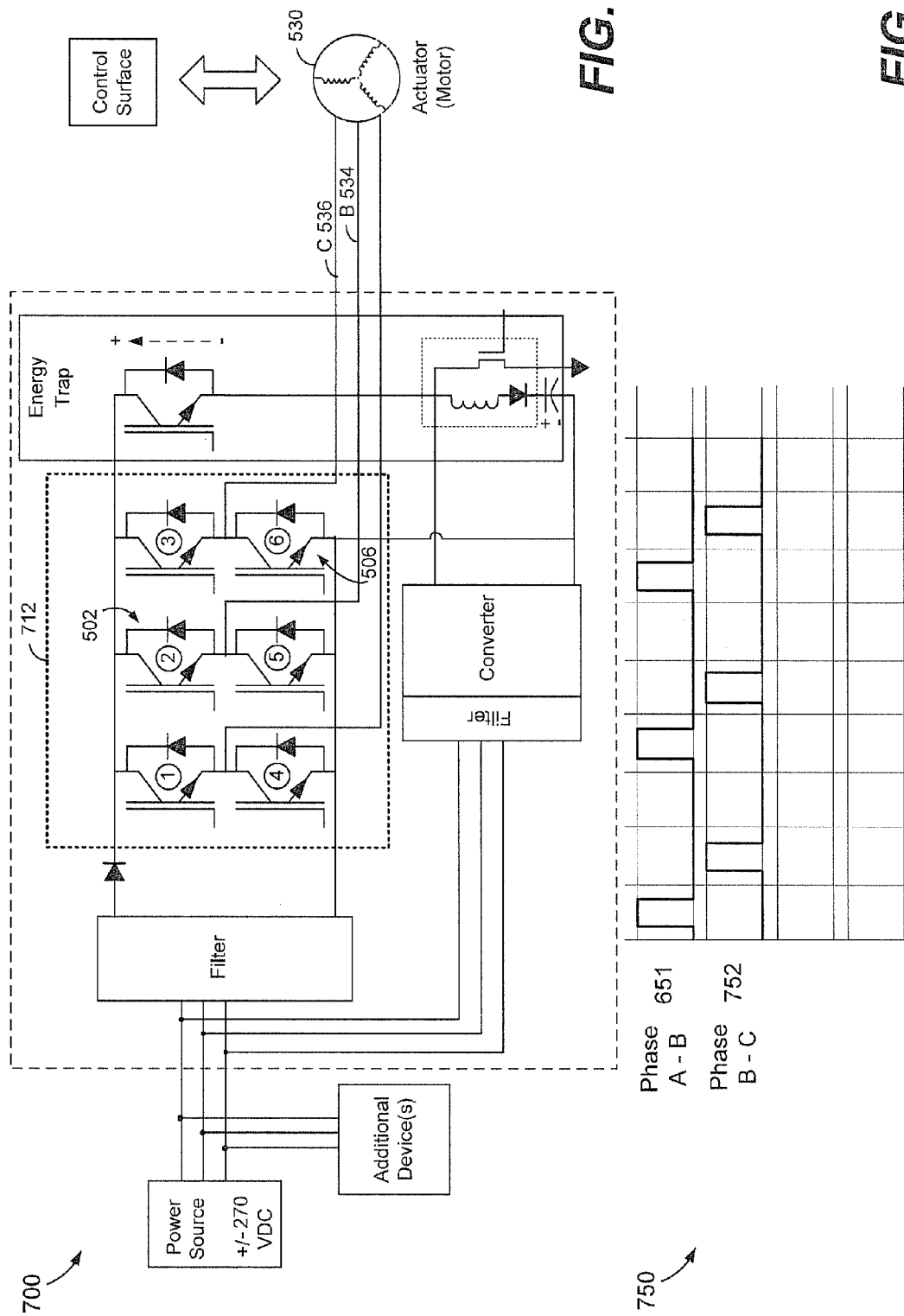

FIG. 6A is a schematic diagram of the energy capture and distribution system, generally designated 600, and FIG. 6B is a first cumulative plot 650 of commutation pulses applied to the actuator 630. In the system 600, node 1 (601) and node 5 (605) of the network of transistor nodes 612 provide an A-B phase pulse 651 to actuator line A 632 and actuator line B 634. The first cumulative plot 650 shows an A-B phase pulse 651 that drives the actuator 630 through a first third of the rotation of the three-pole actuator 630. For the sake of illustration, FIG. 6B, like FIGS. 7B and 8B, shows the phase pulse 651 as applied through two rotational cycles of the actuator 630. Thus, FIG. 6B shows two sequential A-B phase pulses.

FIG. 7A is a schematic diagram of the energy capture and distribution system, generally designated 700, and FIG. 7B is a second cumulative plot 750 of commutation pulses applied to the actuator 730. In the system 700, node 2 (702) and node 6 (706) of the network of transistor nodes 712 provide a B-C phase pulse 752 to actuator line B 734 and actuator line C 736. The second cumulative plot 750 shows an B-C phase pulse 752 that drives the actuator 730 through a second third of the rotation of the three-pole actuator 730.

FIG. 8A is a schematic diagram of the energy capture and distribution system, generally designated 800, and FIG. 8B is a third cumulative plot 850 of commutation pulses applied to the actuator 830. In the system 800, node 3 (803) and node 4 (804) of the network of transistor nodes 812 provide a C-A phase pulse 853 to actuator line C 836 and actuator line A 832. The third cumulative plot 850 shows a C-A phase pulse 853 that drives the actuator 830 through a final third of the rotation of the three-pole actuator 830. The application of the phased pulses 651, 752, and 853 drives the actuator 830 through a full three-hundred-sixty degree rotational cycle of the actuator 830. The application of the phased pulses 651, 752, and 853, may be repeated as desired to continue to drive the rotational cycle of the actuator 830.

Figure 9:
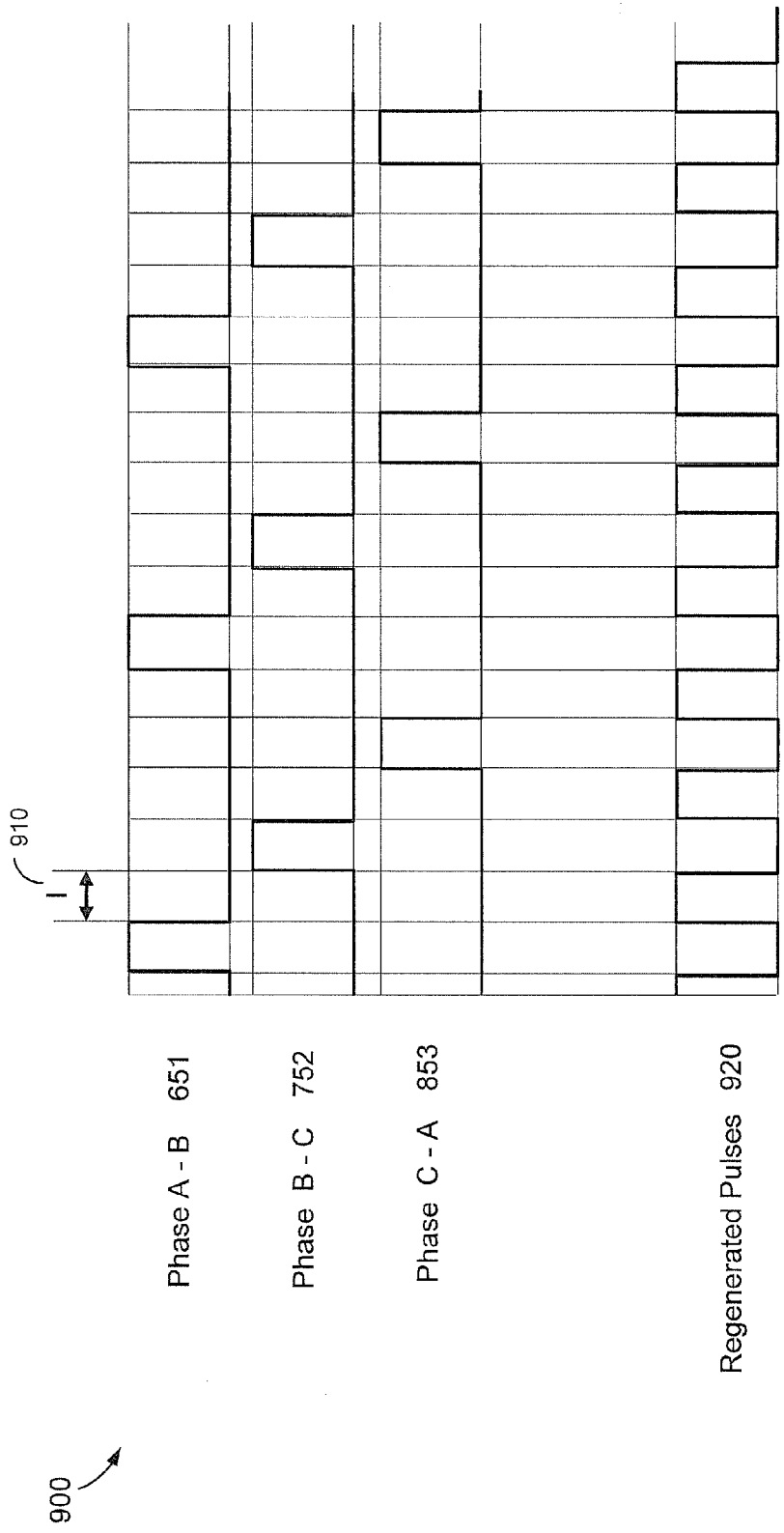
FIG. 9 is a plot of pulses harvested between the commutation pulses applied to drive the actuator as illustrated in the cumulative plot of FIG. 8B.

FIG. 9 shows a plot 900 including the cumulative plot of the commutation pulses 651, 752, and 853 of FIG. 8B to illustrate harvesting of power between the commutation pulses 651, 752, and 853. Between application of the commutation pulses 651, 752, and 853, there is an interval I 910. With reference to FIG. 8, during each interval I 910 between commutation pulses, the actuator 830 may continue to rotate. As a result, the actuator 830 may generate power during each interval I 910, as depicted by regenerated pulses 920. The regenerated pulses 920 may be harvested and stored in an energy storage device, such as described with reference to FIGS. 2-4.

Figure 10:
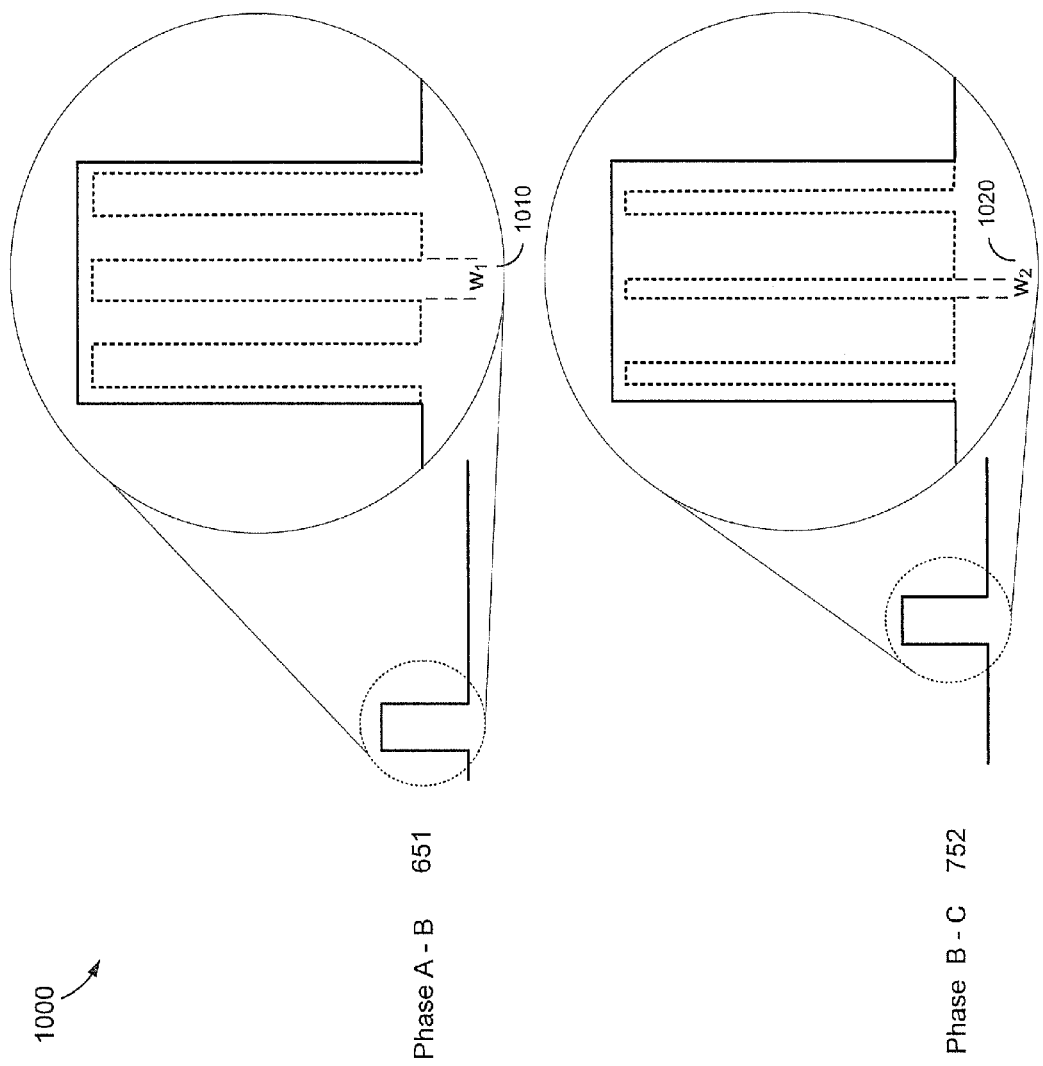
FIG. 10 is a plot of exemplary commutation pulses applied to selectively drive an actuator at a desired level of torque using pulse width modulation.

FIG. 10 shows a plot 1000 of commutation pulses 651 and 752 to illustrate that the commutation pulses 651 and 752 may be modulated using pulse width modulation. Using pulse width modulation, which may be controlled, for example, by the plurality of transistor nodes 512-812 of FIGS. 5-8, controls how much power is applied to the actuator 530-830. The width of the pulses controls the torque of the actuator 530-830. Thus, the commutation pulse 651 is modulated at a first pulse width $w_1$ 1010 and the commutation pulse 752 is modulated at a second pulse width $w_2$ 1020. The relatively narrower pulse $w_2$ 1020 results in the actuator 530-830 generating less torque than the relatively wider pulse $w_1$ 1010.

Figure 11:
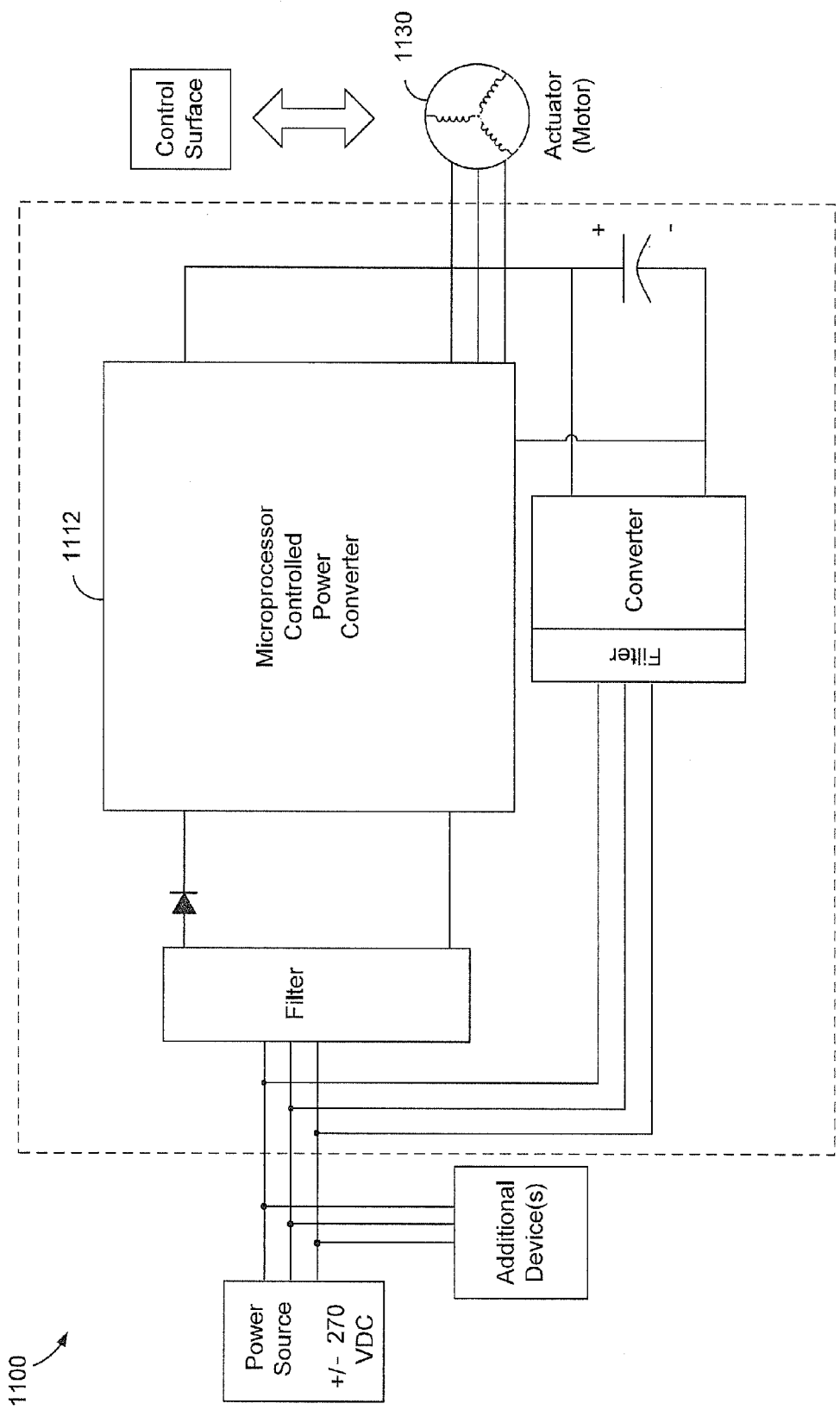
FIG. 11 is a schematic diagram of another particular illustrative embodiment of an energy capture and distribution system.

FIG. 11 is a schematic diagram of another particular illustrative embodiment of an energy capture and distribution system, generally designated 1100, as previously described with reference to the block diagram of FIG. 1. The energy capture and actuator control system 1100 is substantially the same as the energy capture and actuator control system 200, except that, instead of using a network of transistor nodes 212 and an energy trap 218 to direct and distribute energy, a microprocessor controlled power converter 1112 is programmed and configured to direct and distribute power in the energy capture and actuator control system 1100. Thus, for example, the microprocessor controlled power converter 1112 controls the application of the commutation pulses to the actuator 1130 (as well as pulse width modulation of the commutation pulses) and the harvesting of power generated by the actuator 1130 as previously described.

Figure 12:
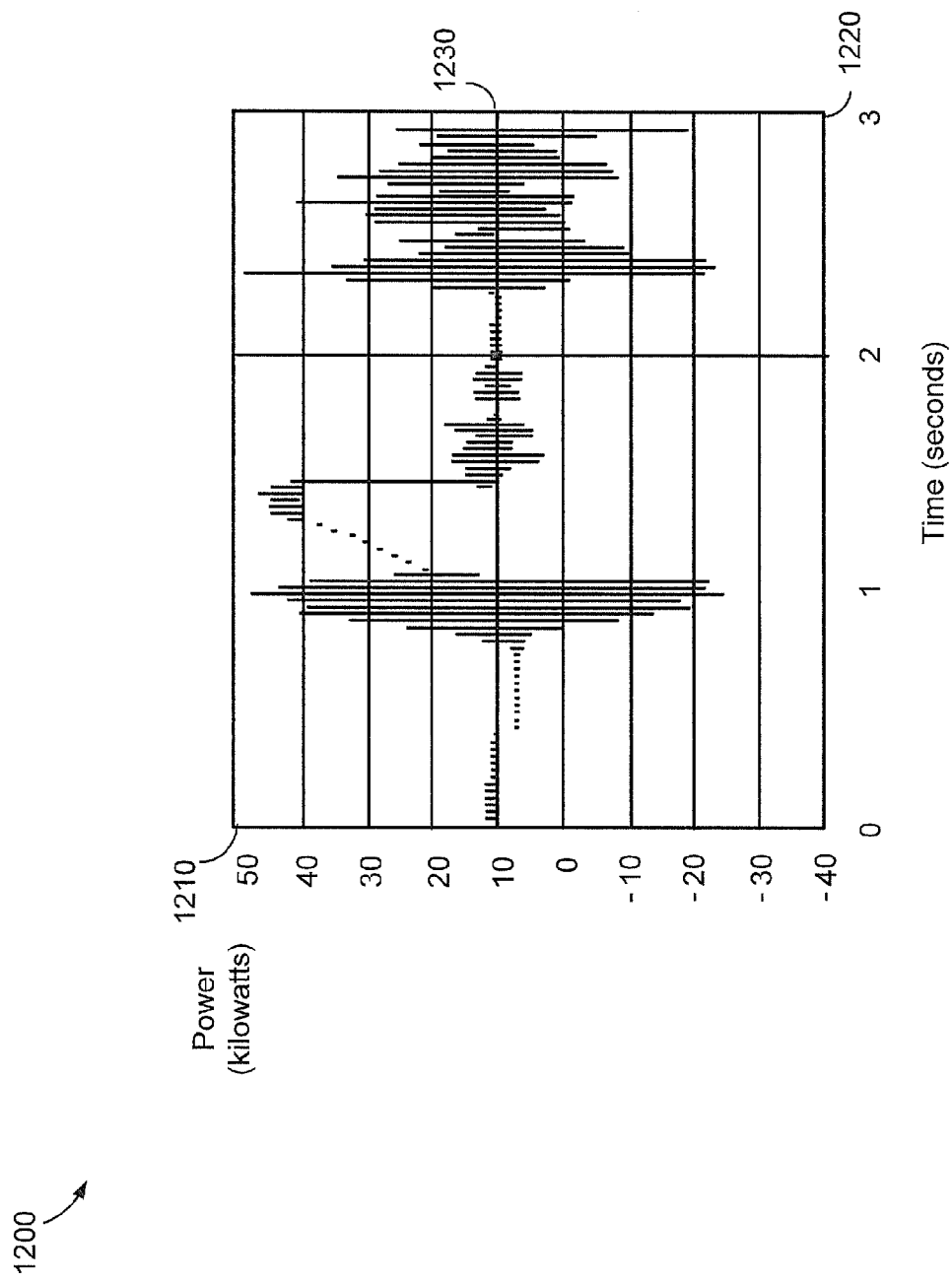
FIG. 12 is a graph of power versus time illustrating representative power fluctuations on a bus configured to distribute energy between one or more power sources and an actuator.

FIG. 12 is a graph 1200 of power 1210, which is the rate at which electrical energy is transferred over time, plotted on a vertical axis against time 1220, plotted on a horizontal axis. The graph 1200 illustrates a representative fluctuation in power 1210 on a bus coupling a power source to an actuator as shown in FIGS. 1-3. For sake of illustration, the anticipated or desired (average) power level is assumed to be ten kilowatts (10 kW), a level that would cause an actuator to desirably position a control surface to maintain a position or attitude of the vehicle. As a result of operating conditions, the actuator draws additional power, at times reaching nearly fifty kilowatts (50 KW). However, over that same interval, as a result of the same operating conditions applying external forces to a control surface, the actuator effectively generates power of more than 20 kilowatts (20 kW), as represented by the negative twenty kilowatt values (−20 kW) represented in the graph. As previously described, particular illustrative embodiments enable generated power to be captured and stored so that, for example, when an actuator requires additional power, that power may be drawn from an energy storage device to provide the desired power.

Figure 13:
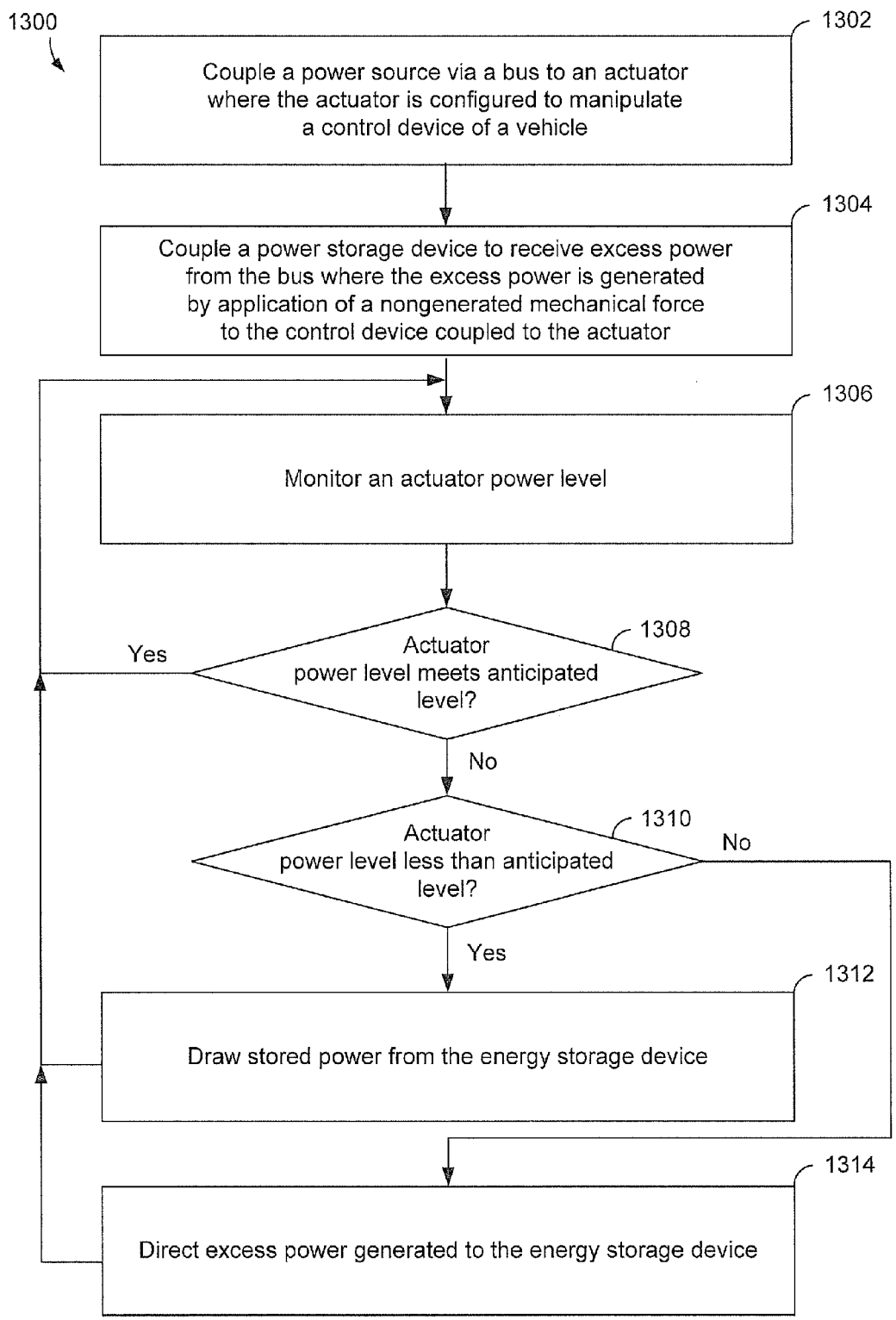
FIG. 13 is a flow diagram of a method for capturing and using energy generated by an externally-applied mechanical force applied to a control device coupled with an actuator.

FIG. 13 is a flow diagram 1300 of a method for capturing and using energy as the result of power generated by an externally-applied mechanical force applied to a control device coupled with an actuator or from the numerous start/stop events of the actuator motor. At 1302, an energy source is coupled via a bus to an actuator where the actuator is configured to manipulate a control device of a vehicle. At 1304, an energy storage device is coupled to receive excess power from the bus, resulting from application of external nongenerated mechanical force to the control device coupled to the actuator, such as an externally-applied force or an inertial force, and convert the excess power to stored potential energy. At 1306, an actuator power level is monitored.

At 1308, it is determined whether the actuator power level meets an anticipated power level. If so, at 1306, the actuator power level continues to be monitored. However, when it is determined, at 1308, that the actuator power level does not meet the anticipated power level, at 1310, it is determined whether the actuator power level is less than the anticipated power level. If so, at 1312, stored power is drawn from the energy storage device, and, at 1306, the actuator power level continues to be monitored. On the other hand, if it is determined, at 1310, that the actuator power level is not less than the anticipated power level, at 1314, excess power generated is directed to the energy storage device and, at 1306, the actuator power level continues to be monitored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A system comprising:
an actuator control system comprising:
a controller configured to direct power from a power source to a particular actuator, wherein the particular actuator is coupled to a control device to apply a force related to operation of a vehicle, wherein the controller includes a network of transistor nodes; and
a buck-boost circuit configured to direct excess power generated by the particular actuator to an energy storage device when an actuator power level of the particular actuator is greater than an anticipated power level, wherein the buck-boost circuit includes an inductor coupled in series with a diode and includes a switching device that is coupled to a relative ground, wherein energy is accumulated at the energy storage device when the switching device is in a first mode, and energy is drawn from the energy storage device when the switching device is in a second mode, and wherein the buck-boost circuit is coupled to an output of the network of transistor nodes.

2. The system of claim 1, wherein the diode is coupled to a positive terminal of the energy storage device.

3. The system of claim 1, wherein each transistor node of the network of transistor nodes includes an integrated gate bipolar transistor (IGBT) and a reverse current diode.

4. The system of claim 1, wherein the vehicle includes one of an aircraft, a ground vehicle, and a water craft.

5. The system of claim 1, further comprising:
a first filter coupled to the controller and configured to receive the power from the power source via a bus;
a blocking diode positioned between the controller and the first filter;
a converter having an input coupled to the energy storage device; and
a second filter coupled to an output of the converter.

6. The system of claim 1, wherein the switching device includes a transistor.

7. The system of claim 6, wherein an output of the buck-boost circuit is based on a duty cycle of the transistor switching between the first mode and the second mode.

8. The system of claim 1, further comprising a blocking diode positioned between the controller and a bus, wherein the blocking diode is configured to prohibit the excess power generated by the particular actuator from being supplied to the bus via the controller.

9. A method comprising:
   directing, at a controller of an actuator control system of a particular actuator, power from a power source to the particular actuator, wherein the particular actuator is coupled to a control device to apply a force related to operation of a vehicle, wherein the controller includes a network of transistor nodes; and
   directing, at the actuator control system, excess power generated by the particular actuator to an energy storage device via a buck-boost circuit when an actuator power level of the particular actuator is greater than an anticipated power level, wherein the buck-boost circuit includes an inductor coupled in series with a diode and includes a switching device that is coupled to a relative ground, wherein energy is accumulated at the energy storage device when the switching device is in a first mode, and energy is drawn from the energy storage device when the switching device is in a second mode, and wherein the buck-boost circuit is coupled to an output of the network of transistor nodes.

10. The method of claim 9, further comprising drawing supplemental power from the energy storage device to a bus via the buck-boost circuit.

11. The method of claim 9, further comprising:
   receiving the power from the power source via a bus; and
   monitoring the actuator power level.

12. The method of claim 9, wherein the particular actuator uses the power to manipulate the control device to direct the operation of the vehicle and wherein the particular actuator includes at least one of a motor, a pneumatic cylinder, a hydraulic cylinder, and a shape memory alloy linkage.

13. The method of claim 9, wherein the power source includes at least one of a generator, a battery, and a fuel cell.

14. The method of claim 9, wherein the energy storage device includes at least one of a chemical storage device, an electrochemical storage device, a lithium ion battery, an electric double-layer capacitor, and a flywheel.

15. A system comprising:
   an actuator control system comprising:
      means for directing power from a power source to a particular actuator, wherein the particular actuator is coupled to a control device to apply a force related to operation of a vehicle, wherein the means for directing includes means for generating a communication pulse that is applied to the particular actuator; and
      a buck-boost circuit configured to direct excess power generated by the particular actuator to an energy storage device when an actuator power level of the particular actuator is greater than an anticipated power level, wherein the excess power is directed to the energy storage device during an interval between two consecutive communication pulses generated by the means for generating, and wherein the buck-boost circuit is coupled to an output of the means for directing.

16. The system of claim 15, wherein the means for directing includes one of a microprocessor and a network of transistor nodes.

17. The system of claim 15, wherein the control device includes at least one of a motor, a fan, an aileron, a flap, a rudder, a slat, a stabilator, a flaperon, a steering linkage, a shock absorber, and a sail.

* * * * *